United States Patent
Mirza et al.

(10) Patent No.: US 11,363,517 B1
(45) Date of Patent: Jun. 14, 2022

(54) POLICY NODE GROUPING FOR EFFICIENT NETWORK OPERATION

(71) Applicant: T-Mobile USA, Inc., Bellevue, WA (US)

(72) Inventors: Khurram Ahmad Mirza, Bellevue, WA (US); Sasikala Mannepally, Bellevue, WA (US); Shujaur Mufti, Snoqualmie, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 17/233,248

(22) Filed: Apr. 16, 2021

(51) Int. Cl.
*H04W 28/08* (2009.01)
*H04W 76/18* (2018.01)
*H04W 40/12* (2009.01)
*H04W 76/12* (2018.01)
*H04W 36/26* (2009.01)

(52) U.S. Cl.
CPC ....... *H04W 40/12* (2013.01); *H04W 28/0925* (2020.05); *H04W 28/0975* (2020.05); *H04W 36/26* (2013.01); *H04W 76/12* (2018.02)

(58) Field of Classification Search
CPC . H04W 40/12; H04W 28/08; H04W 28/0958; H04W 28/0925; H04W 28/0975; H04W 36/26; H04W 76/12
See application file for complete search history.

(56) References Cited

U.S. PATENT DOCUMENTS

| | | | |
|---|---|---|---|
| 9,516,577 B2 * | 12/2016 | Punz | H04W 8/20 |
| 9,560,082 B2 * | 1/2017 | Rasanen | H04L 65/1016 |
| 10,284,420 B2 * | 5/2019 | Livanos | H04W 4/24 |
| 10,491,753 B2 * | 11/2019 | Al-Mehdar | H04L 65/1006 |
| 10,764,376 B2 * | 9/2020 | Stammers | H04L 65/1066 |
| 10,917,527 B2 * | 2/2021 | Ahmadi | H04W 80/10 |
| 2017/0063628 A1 * | 3/2017 | Rasanen | H04L 41/0893 |
| 2021/0152615 A1 * | 5/2021 | Karampatsis | H04L 65/1069 |

* cited by examiner

*Primary Examiner* — Ahmed Elallam

(57) ABSTRACT

Policy node grouping provides efficient network operation by improving the speed and reliability of policy node traffic. Disclosed solutions include: receiving, at a proxy-call session control function (P-CSCF), from a user equipment (UE), a data traffic session request; based on at least the data traffic session request and group policy criteria, selecting a policy node group from among a plurality of policy node groups, the plurality of policy node groups each comprising policy node peers grouped by a service type; based on at least the selected policy node group, determining a selected policy node; based on at least the selected policy node and the data traffic session request, establishing a data traffic session for the UE; and based on at least meeting policy node failover criteria and a failover latency timer, performing an inter-group or intra-group failover according to the group policy criteria.

20 Claims, 8 Drawing Sheets

POLICY NODE GROUPING FOR EFFICIENT NETWORK OPERATION

BACKGROUND

A proxy-call session control function (P-CSCF) is a session initiation protocol (SIP) proxy that provides a point of contact for a user equipment (UE) in a mobile network. A P-CSCF acts as a SIP proxy by forwarding SIP messages between the UE and an internet protocol (IP) multimedia system (IMS) core network and incorporates the application function (AF) aspect of policy and charging control (PCC). PCC enables packets flowing through an access network that provides IP connectivity to be associated with a particular charging key for billing. For example, an AF assists with policy and charging for IMS application sessions, such as voice calls over cellular networks, and with setting up appropriate quality of service (QoS) bearers in coordination with a policy node.

Policy nodes (e.g., policy control functions (PCFs) or policy and charging rules functions (PCRFs)) are grouped into destination realms (also known as diameter realms), each of which may include multiple policy nodes and a diameter routing agent (DRA). A P-CSCF may perform load balancing for the policy nodes within a particular destination realm, and also error redirection within the destination realm being used. However, if the DRA of the destination realm fails, or there is a high failure or error rate of the policy nodes, or the policy nodes are loaded heavily, the destination realm being used may under-perform and negatively impact user experience.

SUMMARY

The following summary is provided to illustrate examples disclosed herein, but is not meant to limit all examples to any particular configuration or sequence of operations.

Policy node grouping provides efficient network operation by improving the speed and reliability of policy node traffic. Disclosed solutions include: receiving, at a proxy-call session control function (P-CSCF), from a user equipment (UE), a data traffic session request; based on at least the data traffic session request and group policy criteria, selecting a policy node group from among a plurality of policy node groups, the plurality of policy node groups each comprising policy node peers grouped by a service type; based on at least the selected policy node group, determining a selected policy node; based on at least the selected policy node and the data traffic session request, establishing a data traffic session for the UE; and based on at least meeting policy node failover criteria and a failover latency timer, performing an inter-group or intra-group failover according to the group policy criteria.

BRIEF DESCRIPTION OF THE DRAWINGS

The disclosed examples are described below with reference to the accompanying drawing figures listed below, wherein.

Figure 1:
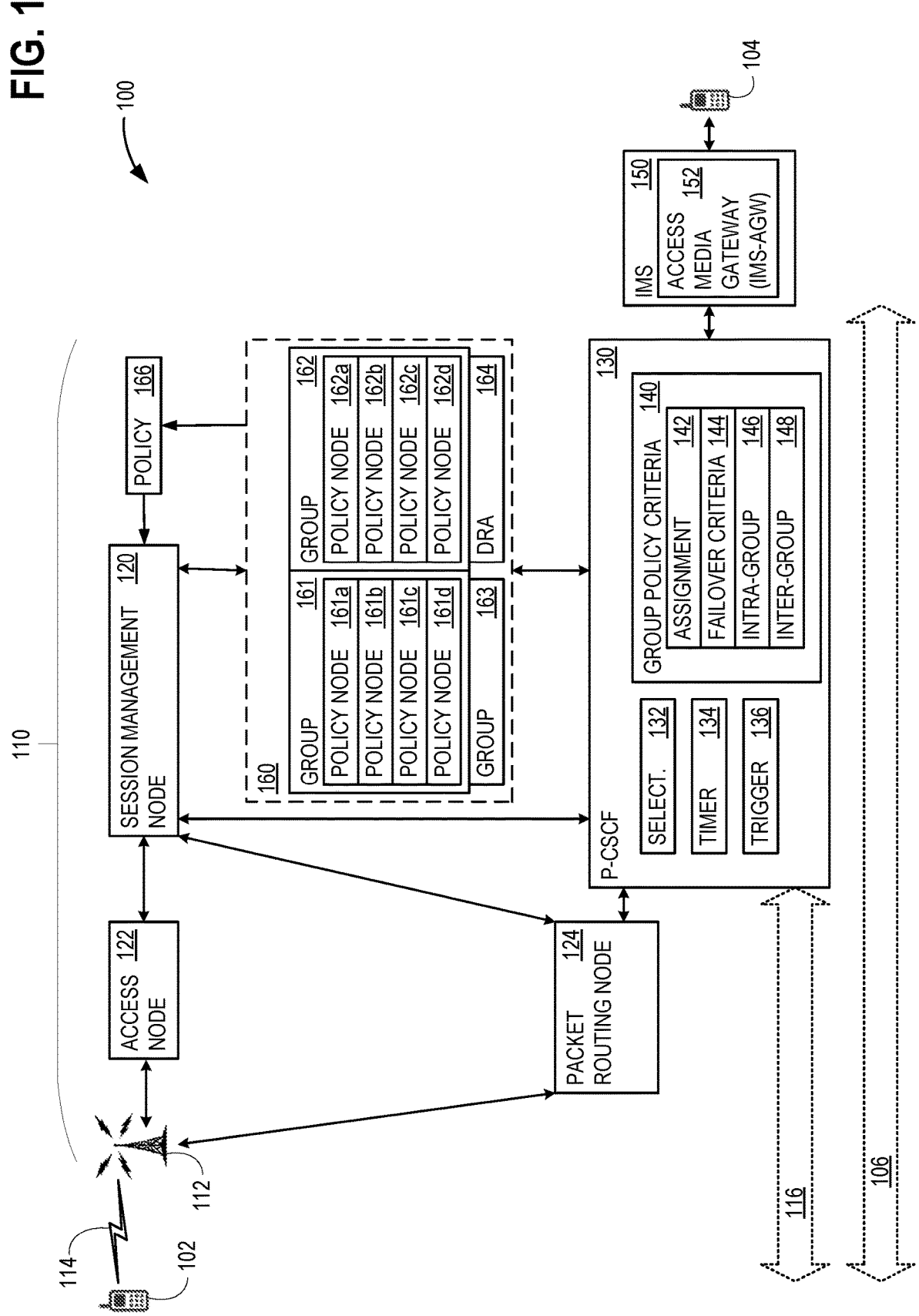
FIG. 1 illustrates an exemplary arrangement that advantageously enables policy node traffic routing with grouped policy nodes.

Corresponding reference characters indicate corresponding parts throughout the drawings. References made throughout this disclosure. relating to specific examples, are provided for illustrative purposes, and are not meant to limit all implementations or to be interpreted as excluding the existence of additional implementations that also incorporate the recited features.

DETAILED DESCRIPTION

Policy node grouping provides efficient network operation by improving the speed and reliability of policy node traffic. Disclosed solutions include: receiving, at a proxy-call session control function (P-CSCF), from a user equipment (UE), a data traffic session request; based on at least the data traffic session request and group policy criteria, selecting a policy node group from among a plurality of policy node groups, the plurality of policy node groups each comprising policy node peers grouped by a service type; based on at least the selected policy node group, determining a selected policy node; based on at least the selected policy node and the data traffic session request, establishing a data traffic session for the UE; and based on at least meeting policy node failover criteria and a failover latency timer, performing an inter-group or intra-group failover according to the group policy criteria.

Aspects of the disclosure improve the operation of computer networks by selecting a policy node group from among a plurality of policy node groups, based on at least the data traffic session request and group policy criteria, selecting a policy node group from among a plurality of policy node groups, and/or performing an inter-group or intra-group failover according to the group policy criteria, based on at least meeting policy node failover criteria and a failover latency timer. Aspects of the disclosure are able to save significant manual effort in reconfiguring network assets to transition services from using a particular vendor to using a different vendor (e.g., a vendor of policy node services).

A policy node may be, for example, a policy and charging rules function (PCRF) for fourth generation (4G) cellular service, or a policy control function (PCF) for fifth generation (5G) cellular service. Policy nodes provide information for whether a user equipment (UE) is permitted to engage in a particular data traffic session, such as a voice over long term evolution (VoLTE) call in 4G or a voice over new radio (VoNR) in 5G, and if so, the billing arrangement. Such information is valuable upon receiving a session initiation protocol (SIP) invite message from the UE, and a delay in receiving this information may result in delaying the setup for the UE, negatively impacting the user experience. Maintaining speed and reliability in determining the policy to apply to the requested data traffic session thus improves user experiences.

Aspects of the disclosure define multiple policy node groups (e.g., PCRF groups or PCF groups) and use configurable policy criteria to enable selection of a particular policy node group for current and/or future services (e.g., 4G, 5G, wireless priority service (WPS), rich communication service (RCS), or others). In some examples, a policy node group has four policy nodes. In some examples, a session border gateway (SBG) performs the selection. In some examples, a P-CSCF performs the selection. In some examples, diameter routing agents (DRAs) may perform load balancing. In some examples, a round-robin selection is used for load balancing among the policy nodes within a group, but excluding a policy node that is identified as the policy node that receives failovers.

Different policy criteria may manage traffic for outage or other events, for example: "if group A times out, select group B; if group A returns errors, select group C." The timeout for triggering a failover may be configurable (e.g., 700 milliseconds). Policy nodes within a group may be referenced as policy node peers. Groups may be defined according to vendors who provide policy node networks, and may include diameter routing agents (DRAs). In some scenarios three different commercial vendors provide policy nodes, but moving traffic from one vendor to another may require significant effort (e.g., human labor). Aspects of the disclosure may significantly reduce the level of effort needed for moving from one vendor's policy node network to a different vendor's policy node network.

Failovers may be within a group (intra-group) or from one group to another (inter-group). Failovers may be triggered according to policy node failover criteria, such as error rate (e.g., more than 300 or 400 errors per second), a time out, a broken link, or even a manual trigger. If the number of failed policy nodes within a group is sufficiently small (e.g., only one or two), then a failover may be an intra-group failover, whereas if the number of failed policy nodes within a group is sufficiently large (e.g., three out of four), the failover may be an inter-group failover.

FIG. 1 illustrates an exemplary arrangement 100 that advantageously enables policy node traffic routing with grouped policy nodes. Arrangement 100 is used for establishing a data traffic session 106 for UE 102 on a network 110. Data traffic sessions include voice and video calls between UEs and streaming video. In some examples, data traffic session 106 comprises a voice or video call with another UE 104. Voice calls may be VoNR for 5G cellular, VoLTE for 4G cellular, or another type. In some examples, UE 102 sets up data traffic session 106 using SIP signaling, such as a SIP invite.

Data traffic session 106 passes from UE 102, over an air interface 114, through a radio access network (RAN) 112, a packet routing node 124, a P-CSCF 130, and an internet protocol (IP) multimedia subsystem (IMS) access media gateway (IMS-AGW) 152 in an IMS core network 150, to UE 104. In some examples, UE 102 is assigned to packet routing node 124 via a session management node 120, and UE 102 communicates with session management node 120 via an access node 122. Although only a single RAN 112, a single session management node 120, a single access node 122, a single packet routing node 124, and a single P-CSCF 130, are shown, it should be understood that network 110 may have multiple ones of each.

P-CSCF 130 acts as a SIP proxy by forwarding SIP messages between UE 102 and IMS core network 150 and incorporates the application function (AF) aspect of policy and charging control (PCC). PCC enables packets flowing through network 110 to be associated with a particular charging key for billing. For example, an AF assists with policy and charging for IMS application sessions, such as voice calls over cellular networks, and with setting up appropriate quality of service (QoS) bearers in coordination with a policy node (e.g., one of policy nodes 161*a*-162*d*). P-CSCF 130 and session management node 120 each communicate with a selected one of policy nodes 161*a*-162*d*, which are illustrated as being grouped into a plurality of policy node groups 160. A policy 166 is produced by a selected one of policy nodes 161*a*-162*d* to apply to data traffic session 106 (e.g., charging for a voice call). Data traffic session 106 may be initiated by a data traffic session request 116 originating from UE 102 (e.g., SIP signaling, such as a SIP invite).

Policy nodes 161*a*-162*d* are grouped into policy node groups 161 and 162, each of which includes a plurality of policy nodes. Policy node group 161 comprises a policy node 161*a*, a policy node 161*b*, a policy node 161*c*, and a policy node 161*d*. Policy node group 162 comprises a policy node 162*a*, a policy node 162*b*, a policy node 162*c*, and a policy node 162*d*. A policy node group 163 is configured similarly to policy node groups 161 and 1622*d* (not shown in detail, for clarity). In some examples, a DRA 164 performs load balancing among the policy nodes within policy node groups 161-163, although, in some examples, each of policy node groups 161-163 has its own DRA for load balancing within that policy node group. Although only three policy node groups and a single DRA, are illustrated, it should be understood that some examples use different numbers of policy node groups, policy nodes within each policy node group, and/or DRAs.

Aspects of the disclosure perform hierarchical load balancing and/or failovers (error redirection) at multiple hierarchical tiers: across policy node groups and also within the selected policy node group. This way, if a particular policy node group is heavily loaded or experiences a high rate of policy node failures, a different policy node group is selected in order to provide a positive user experience. To accomplish load balancing and/or failover, P-CSCF 130 uses a selection component 132, which references group policy criteria 140. A configurable failover latency timer 134 is used to measure whether a latency period exceeds selectable latency timeout criteria, and a trigger 136 acts as a flag for failovers by identifying the occurrence of failover criteria specified within group policy criteria 140. In some examples, group policy criteria 140 are configured by an operator of network 110.

Policy node assignment criteria 142 (e.g., initial policy node assignment criteria), within group policy criteria 140, may include a scheme such as the first N incoming voice calls go to policy node group 161, the next two go to policy node group 162, and the next two go to policy node group 163. Policy node assignment criteria 142 may also include a round-robin assignment scheme within each policy node group. In some examples, however, a particular policy node will be set aside for failovers, and thus excluded from the round-robin assignment scheme. For example, policy nodes 161*a*-161*c* may receive round-robin assignments for policy node group 161, whereas policy node 161*d* may receive failover traffic. Similarly, policy nodes 162*a*-162*c* may receive round-robin assignments for policy node group 162, whereas policy node 162*d* may receive failover traffic.

Policy node failover criteria 144, also within group policy criteria 140, identify when traffic that had been assigned to one policy node is to failover to another policy node resulting in a trigger condition captured by trigger 136. Policy node failover criteria 144 may be configurable and may include a maximum error rate, a selectable latency timeout, a broken link, another pre-configured trigger condition, and a manual trigger. Intra-group failover criteria 146 is used to determine whether, when a failover has been triggered, whether the failover will keep the traffic within the same policy node group (e.g., fewer than a threshold number of policy node failures). Inter-group failover criteria 148 is used to determine whether, when a failover has been triggered, whether the failover will move the traffic to a different policy node group (e.g., more than a threshold number of policy node failures). Thus, group policy criteria 140 is hierarchical, specifying load balancing and failover criteria for both the policy node level and policy node group level.

Figure 2A:
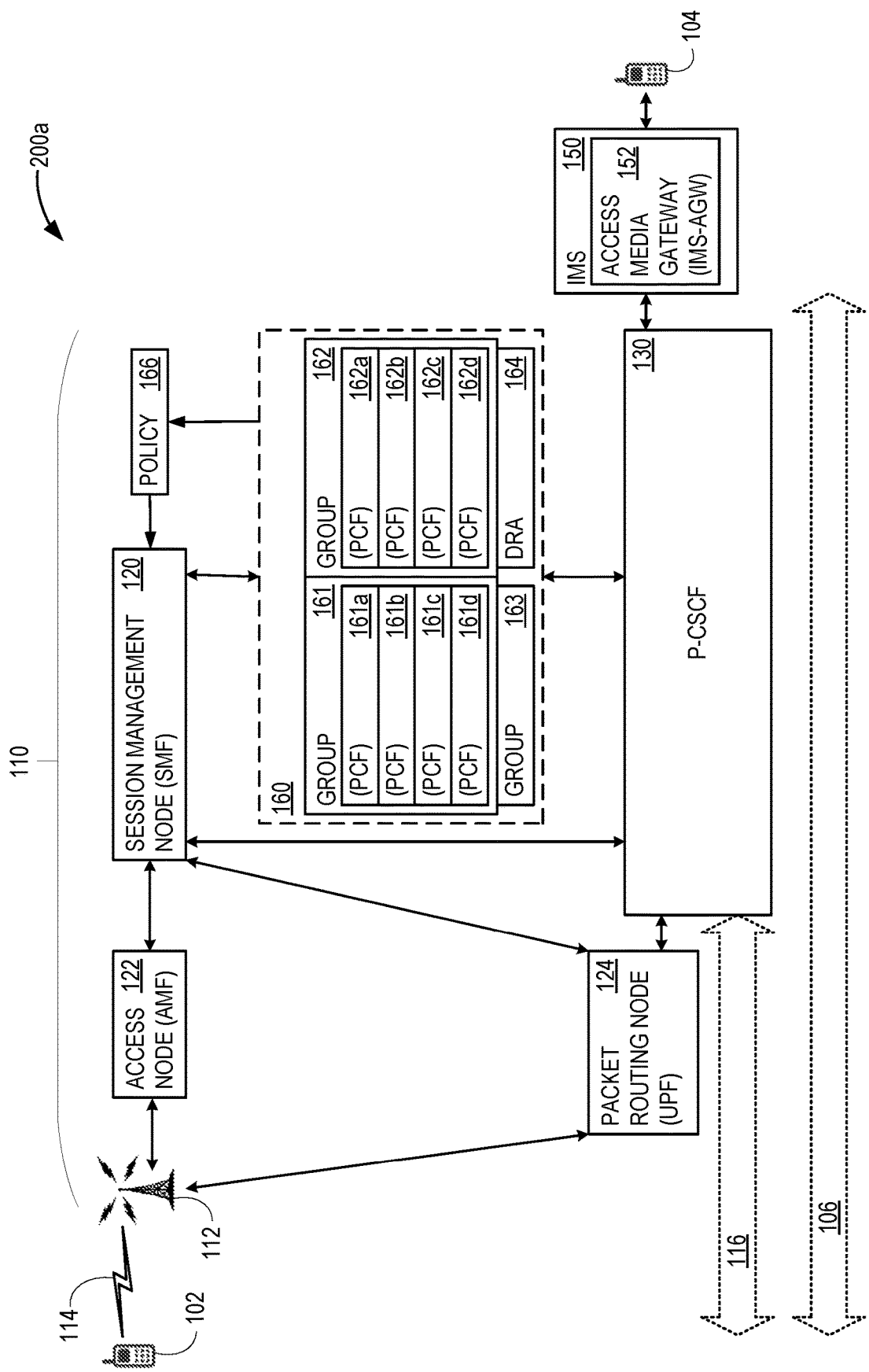
FIG. 2A illustrates a fifth generation (5G) cellular network version of FIG. 1.
Figure 2B:
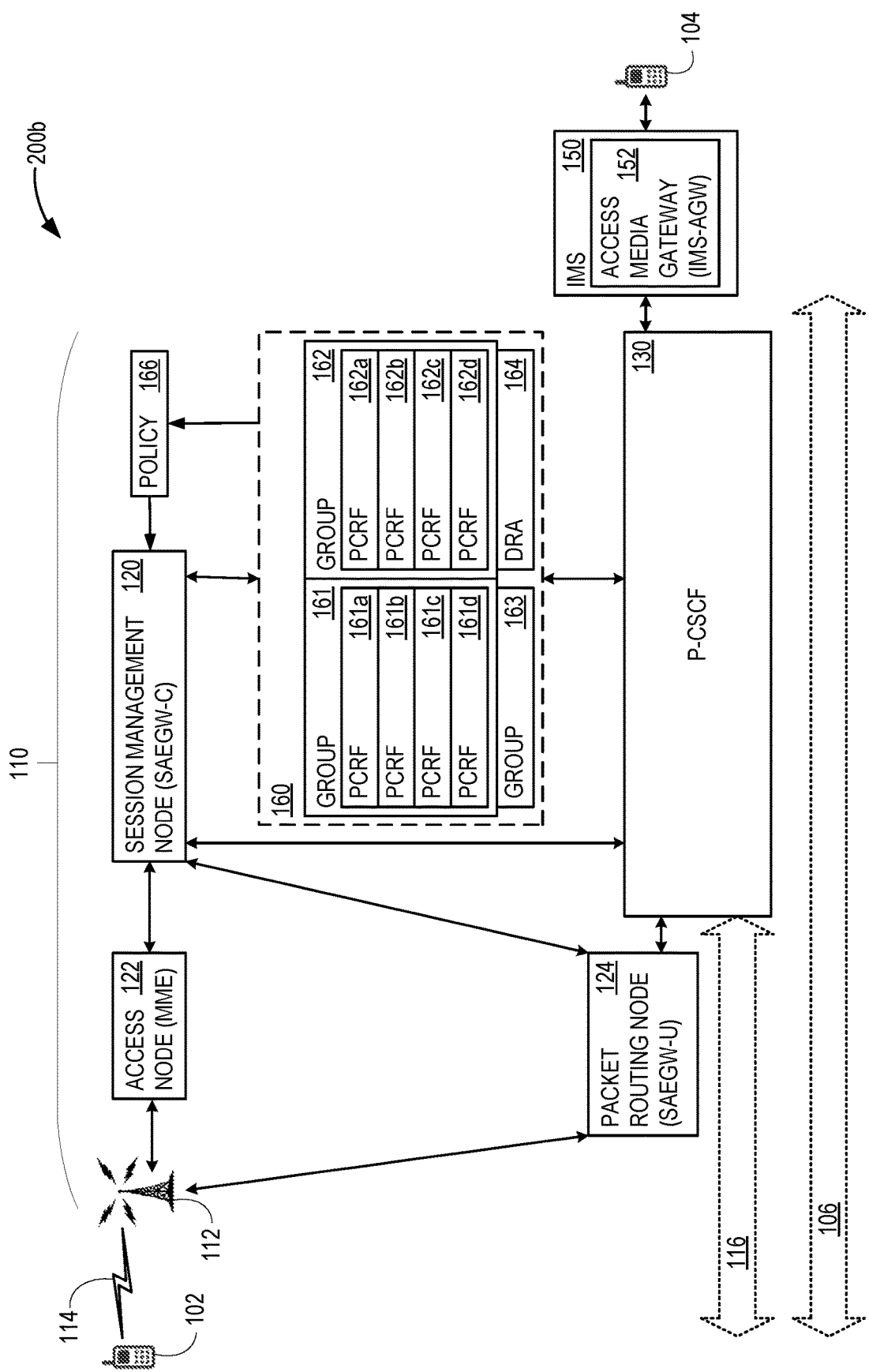
FIG. 2B illustrates a fourth generation (4G) cellular network version of FIG. 1.

Arrangement 100 is shown as a generic arrangement, whereas FIG. 2A illustrates a 5G cellular network version 200a of arrangement 100 and FIG. 2B illustrates a 4G cellular network version 200b of arrangement 100. In FIG. 2A, policy nodes 161a-162d PCFs, session management node 120 comprises a session management function (SMF), access node 122 comprises an access and mobility management function (AMF), and packet routing node 124 comprises a user plane function (UPF).

In FIG. 2B, policy nodes 161a-162d comprise PCRFs, session management node 120 comprises a system architecture (SAE) evolution gateway control plane (SAEGW-C), access node 122 comprises mobility management entity (MME), and packet routing node 124 comprises an SAE evolution gateway user plane (SAEGW-U). An SAEGW-C is a combination of a serving gateway (SGW) control plane (SGW-C) and a packet data network gateway (PGW) control plane (PGW-C). An SAEGW-U is a combination of an SGW user plane (SGW-U) and a PGW user plane (PGW-U). The functional aspects of version 200b are similar to those of version 200a (and arrangement 100).

Figure 3A:
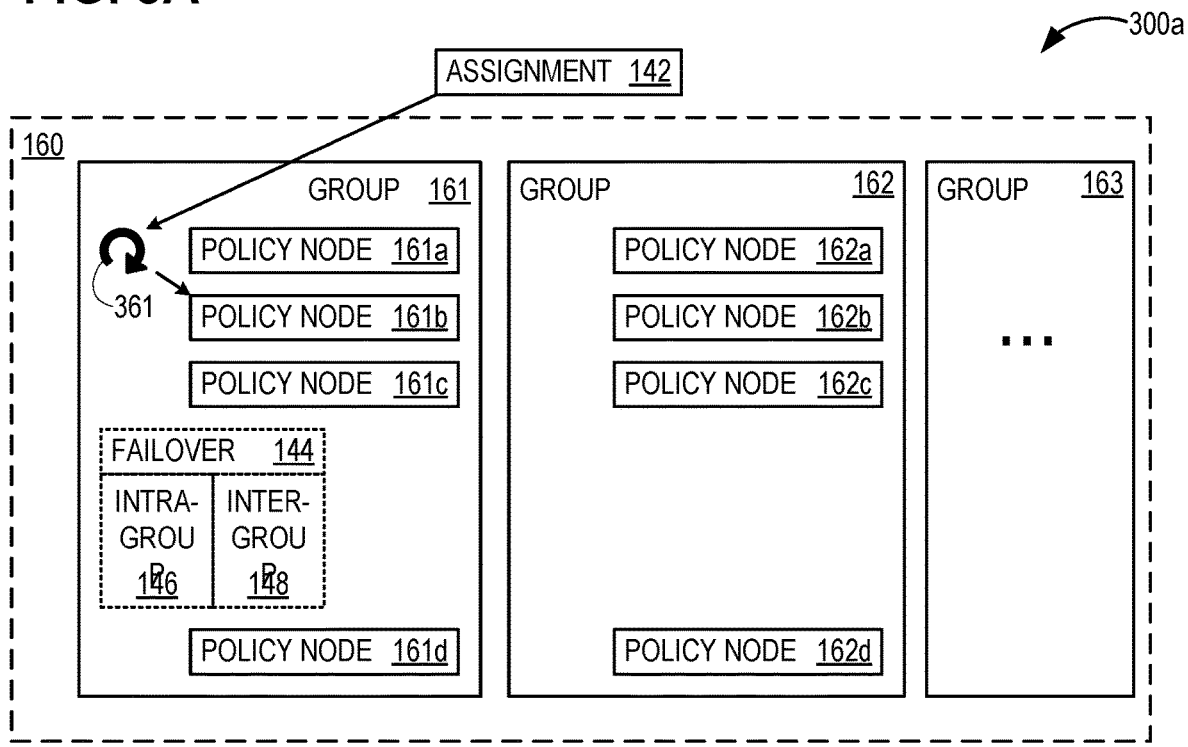
FIG. 3A illustrates selecting a policy node group and a policy node in the arrangement of FIG. 1.
Figure 3B:
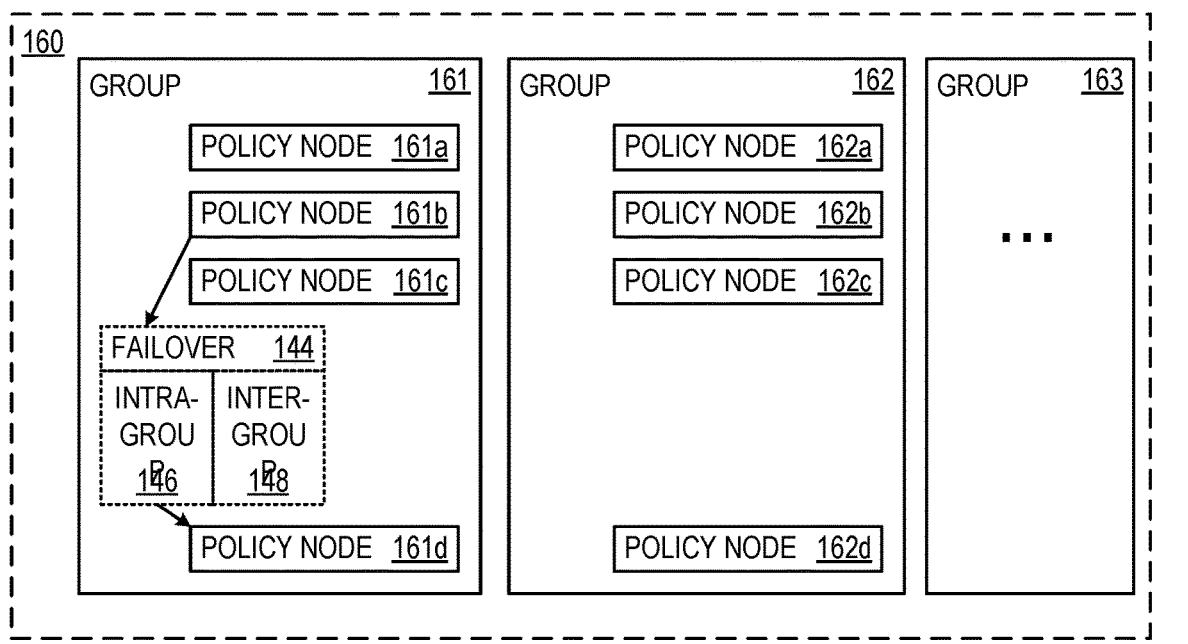
FIG. 3B illustrates an inter-group failover in the arrangement of FIG. 1.

The operation of arrangement 100 is described below in relation to FIG. 4. However, FIGS. 3A-3D provide previews of various operational scenarios. FIG. 3A illustrates selecting a policy node group and a policy node in a scenario 300a. Policy node assignment criteria 142 is used to select policy node group 162 and a round-robin assignment scheme 361 is used to select policy node 161b within policy node group 161. FIG. 3B illustrates an inter-group failover scenario 300b. In scenario 300b, the performance of policy node 161b has triggered policy node policy node failover criteria 144, setting trigger 136 to cause selection component 132 to cause a failover. In scenario 300b, intra-group failover criteria 146 is met (e.g., such as policy node 161b is the only policy node within policy node group 161 that meets policy node failover criteria 144). Thus, a failover occurs from policy node 161b to policy node 161d, which is the identified failover policy node for policy node group 161.

Figure 3C:
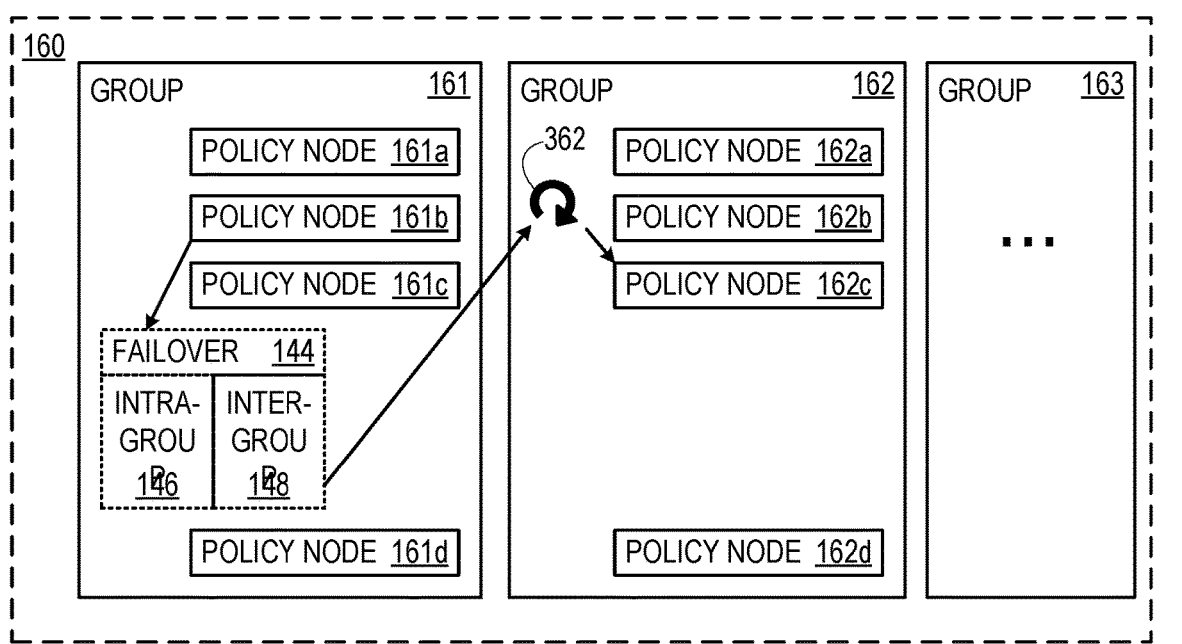
FIG. 3C illustrates a first intra-group failover scenario in the arrangement of FIG. 1.

FIG. 3C illustrates an intra-group failover scenario 300c. In scenario 300c, the performance of policy node 161b has triggered policy node failover criteria 144, setting trigger 136 to cause selection component 132 to cause a failover. In scenario 300c, inter-group failover criteria 148 is met (e.g., such multiple policy nodes within policy node group 161 have met policy node failover criteria 144 within a specified time window). Thus, a failover occurs from policy node 161b within policy node group 161 to policy node group 162, which may be the specified failover policy node group for policy node group 161. The failover traffic is assigned to policy node 162c by a round-robin assignment scheme 362 that is used to select policy node 162c within policy node group 162.

Figure 3D:
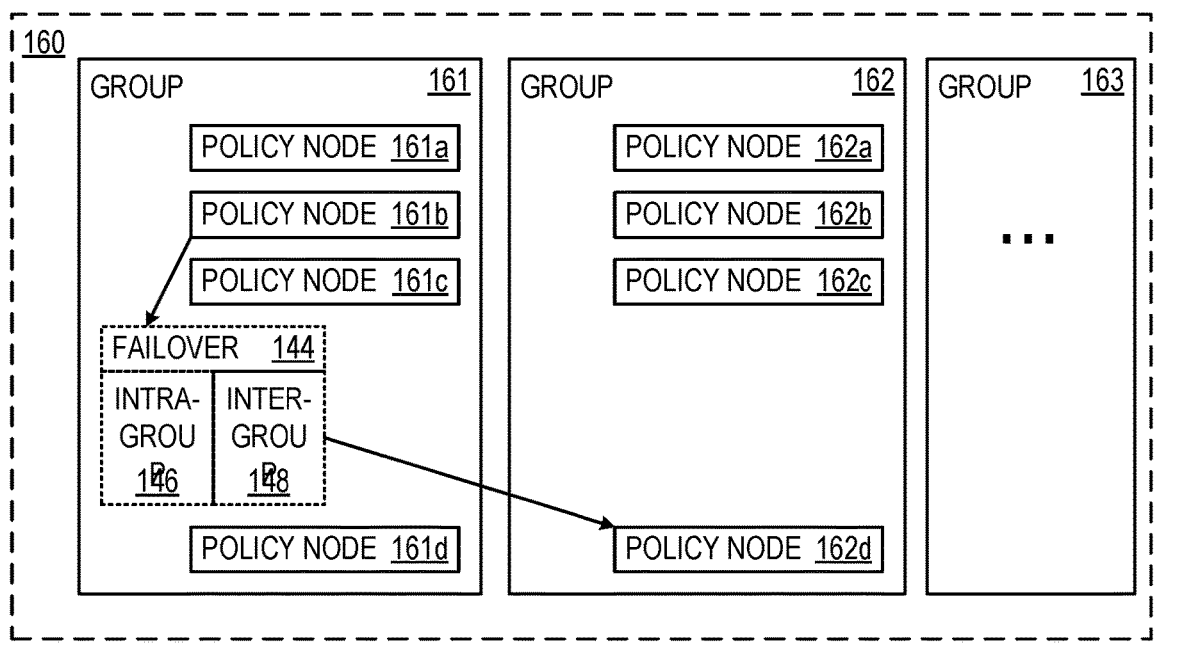
FIG. 3D illustrates a second intra-group failover scenario in the arrangement of FIG. 1.

FIG. 3D illustrates an alternative intra-group failover scenario 300d. Similarly to scenario 300c, the performances of policy node 161b and policy node group 161 have triggered policy node failover criteria 144, setting trigger 136 to cause selection component 132 to cause an inter-group failover to policy node group 162. However, in scenario 300d, failover traffic incoming to policy node group 162 is nor assigned using round-robin assignment scheme 362, but instead goes to policy node 162d, which is the identified failover policy node for policy node group 162.

Figure 4:
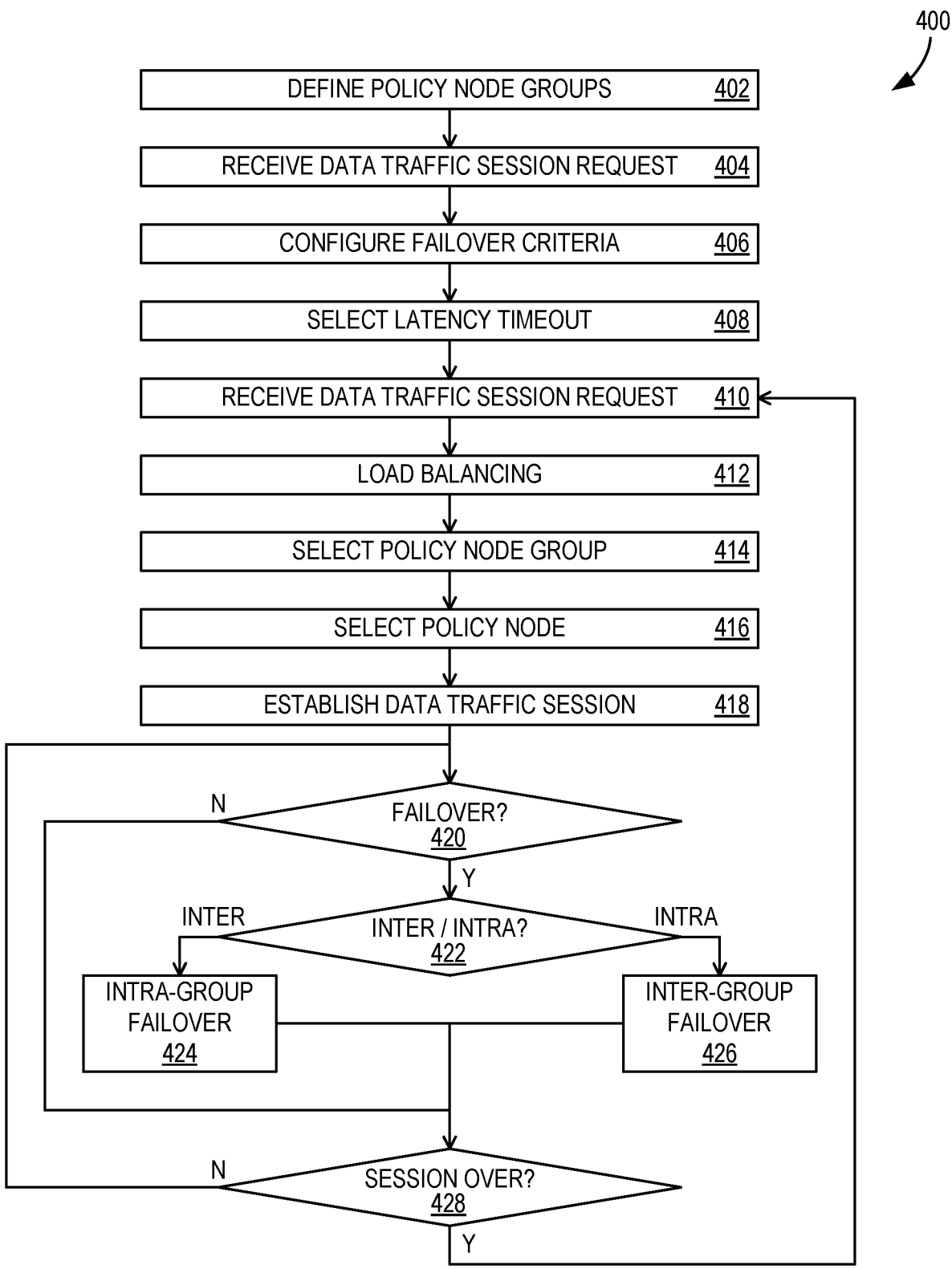
FIG. 4 illustrates a flowchart of exemplary operations that may be associated with examples of the arrangement of FIG. 1.

FIG. 4 illustrates a flowchart 400 of exemplary operations associated with policy node traffic routing in arrangement 100. In some examples, at least a portion of flowchart 400 may be performed using one or more computing devices 600 of FIG. 6. Operation 402 includes defining plurality of policy node groups 160, wherein defining plurality of policy node groups 160 comprises grouping policy node peers by service type (e.g., policy nodes 161a-161d versus policy nodes 162a-162d). In some examples, policy nodes comprise PCRFs and/or PCFs. In some examples, the service type comprises 4G cellular service, 5G cellular service, and/or services from a particular vendor. In some examples, at least one policy node group comprises four policy node peers.

Operation 404 includes configuring policy node failover criteria 144. In some examples, policy node failover criteria 144 comprises at least one criterion selected from the list consisting of: a maximum error rate, a selectable latency timeout, a broken link, a pre-configured trigger condition, and a manual trigger. Operation 406 includes configuring failover latency timer 134 to a selected latency timeout. Operation 408 includes configuring group policy criteria 140 to specify policy node assignment criteria 142, inter-group failover criteria 148, and intra-group failover criteria 146. In some examples, policy node assignment criteria 142 specify a round-robin assignment of policy nodes available for an initial policy node assignment. In some examples, policy node assignment criteria 142 for initial policy node assignment exclude an identified failover policy node from an initial policy node assignment.

Operation 410 includes receiving, at P-CSCF 130, from UE 102, data traffic session request 116. In some examples, data traffic session request 116 comprises a SIP invite. Operation 412 includes performs policy node load balancing. In some examples, P-CSCF 130 performs load balancing; in some examples, DRA 164 performs load balancing; and in some examples, load balancing is accomplished by a combination of DRA 164 and P-CSCF 130. Operation 414 includes, based on at least data traffic session request 116 and group policy criteria 140, selecting a policy node group from among plurality of policy node groups 160, plurality of policy node groups 160 each comprising policy node peers grouped by a service type.

Operation 416 includes, based on at least the selected policy node group, determining a selected policy node (e.g., as shown in FIG. 3A). In some examples, P-CSCF 130 selects both the policy node group and the policy node. In some examples, P-CSCF 130 selects the policy node group and DRA 164 selects the policy node based on load balancing considerations. Operation 418 includes, based on at least the selected policy node and data traffic session request 116, establishing data traffic session 106 for UE 102. In some examples, data traffic session 106 comprises a VoLTE call or a VoNR call.

Decision operation 420 determines whether a failover trigger condition has set trigger 136. If so, decision operation 422 determines whether the failover will be an intra-group failover or an inter-group failover. An intra-group failover (e.g., as shown in FIG. 3B) occurs in operation 424, whereas an inter-group failover (e.g., as shown in FIG. 3C or 3D) occurs in operation 426. Together, operations 424 and 426 include, based on at least meeting policy node failover criteria 144 and failover latency timer 134 (e.g., the failure is a real failure, as opposed to a transitory event), performing an inter-group or intra-group failover according to group policy criteria 140. After the failover, or if one is not needed (see decision operation 420) a decision operation 428 determines whether data traffic session 106 is ongoing or has terminated. If data traffic session 106 remains ongoing, flowchart 400 returns to decision operation 420 to monitor trigger 136 for a failover condition. Otherwise, flowchart 400 returns to operation 410 to wait for another incoming data traffic session request.

Figure 5:
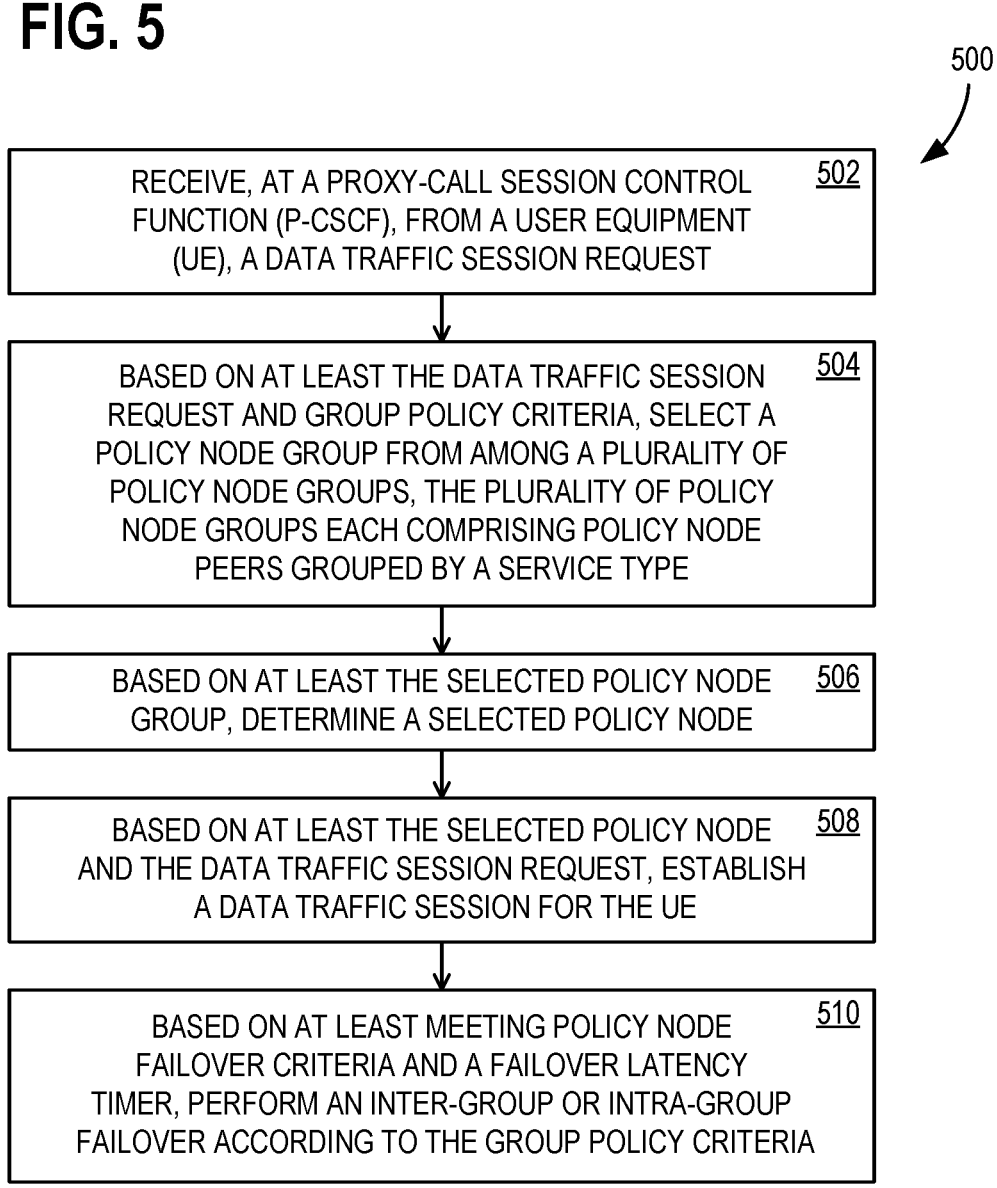
FIG. 5 illustrates another flowchart of exemplary operations that may be associated with examples of the arrangement of FIG. 1.

FIG. 5 illustrates a flowchart 500 of exemplary operations associated with policy node traffic routing. In some examples, at least a portion of flowchart 500 may be performed using one or more computing devices 600 of FIG. 6. Operation 502 includes receiving, at a P-CSCF, from a UE, a data traffic session request. Operation 504 includes, based on at least the data traffic session request and group policy criteria, selecting a policy node group from among a plurality of policy node groups, the plurality of policy node groups each comprising policy node peers grouped by a service type. Operation 506 includes, based on at least the selected policy node group, determining a selected policy node. Operation 508 includes, based on at least the selected policy node and the data traffic session request, establishing a data traffic session for the UE. Operation 510 includes, based on at least meeting policy node failover criteria and a failover latency timer, performing an inter-group or intra-group failover according to the group policy criteria.

Figure 6:
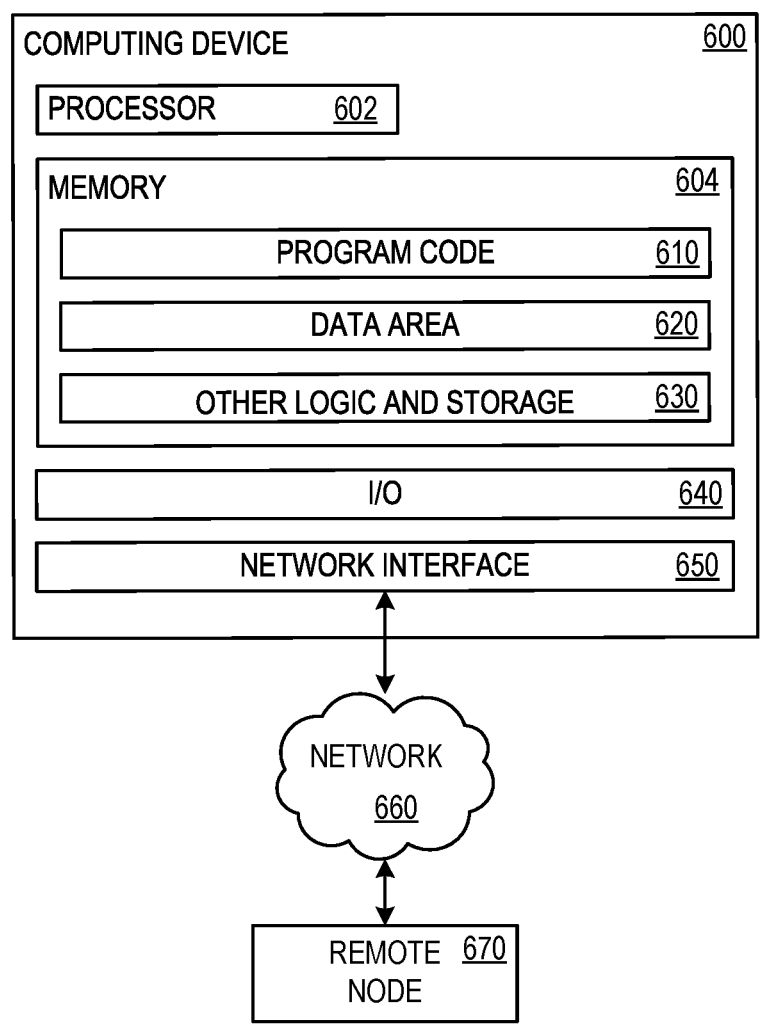
FIG. 6 illustrates a block diagram of a computing device suitable for implementing various aspects of the disclosure.

FIG. 6 illustrates a block diagram of computing device 600 that may be used as a component of arrangement 100, for example, as any component described herein that may require computational or storage capacity. Computing device 600 has at least a processor 602 and a memory 604 that holds program code 610, data area 620, and other logic and storage 630. Memory 604 is any device allowing information, such as computer executable instructions and/or other data, to be stored and retrieved. For example, memory 604 may include one or more random access memory (RAM) modules, flash memory modules, hard disks, solid-state disks, persistent memory devices, and/or optical disks. Program code 610 comprises computer executable instructions and computer executable components including any instructions necessary to perform operations described herein. Data area 620 holds any data necessary to perform operations described herein. Memory 604 also includes other logic and storage 630 that performs or facilitates other functions disclosed herein or otherwise required of computing device 600. An input/output (I/O) component 640 facilitates receiving input from users and other devices and generating displays for users and outputs for other devices. A network interface 650 permits communication over a network 660 with a remote node 670, which may represent another implementation of computing device 600.

ADDITIONAL EXAMPLES

An example method of policy node traffic routing comprises: receiving, at a P-CSCF, from a UE, a data traffic session request; based on at least the data traffic session request and group policy criteria, selecting a policy node group from among a plurality of policy node groups, the plurality of policy node groups each comprising policy node peers grouped by a service type; based on at least the selected policy node group, determining a selected policy node; based on at least the selected policy node and the data traffic session request, establishing a data traffic session for the UE; and based on at least meeting policy node failover criteria and a failover latency timer, performing an inter-group or intra-group failover according to the group policy criteria.

An example system for policy node traffic routing comprises: a processor; and a computer-readable medium storing instructions that are operative upon execution by the processor to: receive, at a P-CSCF, from a UE, a data traffic session request; based on at least the data traffic session request and group policy criteria, select a policy node group from among a plurality of policy node groups, the plurality of policy node groups each comprising policy node peers grouped by a service type; based on at least the selected policy node group, determine a selected policy node; based on at least the selected policy node and the data traffic session request, establish a data traffic session for the UE; and based on at least meeting policy node failover criteria and a failover latency timer, perform an inter-group or intra-group failover according to the group policy criteria.

One or more example computer storage devices has computer-executable instructions stored thereon, which, upon execution by a computer, cause the computer to perform operations comprising: receiving, at a P-CSCF, from a UE, a data traffic session request; based on at least the data traffic session request and group policy criteria, selecting a policy node group from among a plurality of policy node groups, the plurality of policy node groups each comprising policy node peers grouped by a service type; based on at least the selected policy node group, determining a selected policy node; based on at least the selected policy node and the data traffic session request, establishing a data traffic session for the UE; and based on at least meeting policy node failover criteria and a failover latency timer, performing an inter-group or intra-group failover according to the group policy criteria.

Alternatively, or in addition to the other examples described herein, examples include any combination of the following:
- the policy node failover criteria comprises at least one criterion selected from the list consisting of: a maximum error rate, a selectable latency timeout, a broken link, a pre-configured trigger condition, and a manual trigger;
- defining the plurality of policy node groups, wherein defining the plurality of policy node groups comprises grouping the policy node peers by the service type;
- configuring the failover latency timer to a selected latency timeout;
- configuring the group policy criteria to specify policy node assignment criteria, inter-group failover criteria, and intra-group failover criteria;
- the policy node assignment criteria exclude an identified failover policy node from an initial policy node assignment;
- the service type comprises 4G cellular service;
- the service type comprises 5G cellular service;
- the service type comprises services from a particular vendor;

the policy node comprises a PCRF;
the policy node comprises a PCF;
the data traffic session comprises a VoLTE call;
the data traffic session comprises a VoNR call;
the data traffic session request comprises a SIP invite.
at least one policy node group comprises four policy node peers; and
the policy node assignment criteria specify a round-robin assignment of policy nodes available for an initial policy node assignment.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure. It will be understood that the benefits and advantages described above may relate to one embodiment or may relate to several embodiments. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of."

Having described aspects of the disclosure in detail, it will be apparent that modifications and variations are possible without departing from the scope of aspects of the disclosure as defined in the appended claims. As various changes may be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A method of policy node traffic routing, the method comprising:
receiving, at a proxy-call session control function (P-CSCF), from a user equipment (UE), a data traffic session request;
based on at least the data traffic session request and group policy criteria, selecting a policy node group from among a plurality of policy node groups, the plurality of policy node groups each comprising policy node peers grouped by a service type;
based on at least the selected policy node group, determining a selected policy node;
based on at least the selected policy node and the data traffic session request, establishing a data traffic session for the UE; and
based on at least meeting policy node failover criteria and a failover latency timer, performing an inter-group or intra-group failover according to the group policy criteria.

2. The method of claim 1, wherein the policy node failover criteria comprises at least one criterion selected from the list consisting of:
a maximum error rate, a selectable latency timeout, a broken link, a pre-configured trigger condition, and a manual trigger.

3. The method of claim 1, further comprising:
defining the plurality of policy node groups, wherein defining the plurality of policy node groups comprises grouping the policy node peers by the service type.

4. The method of claim 1, further comprising:
configuring the failover latency timer to a selected latency timeout.

5. The method of claim 1, further comprising:
configuring the group policy criteria to specify policy node assignment criteria, inter-group failover criteria, and intra-group failover criteria.

6. The method of claim 5, wherein the policy node assignment criteria exclude an identified failover policy node from an initial policy node assignment.

7. The method of claim 1, wherein:
the service type comprises fourth generation (4G) cellular service, or fifth generation (5G) cellular service, or services from a particular vendor;
the policy node comprises a policy and charging rules function (PCRF) or a policy control function (PCF);
the data traffic session comprises a voice over long term evolution (VoLTE) call or a voice over new radio (VoNR) call; and
the data traffic session request comprises a session initiation protocol (SIP) invite.

8. A system for policy node traffic routing, the system comprising:
a processor; and
a computer-readable medium storing instructions that are operative upon execution by the processor to:
receive, at a proxy-call session control function (P-CSCF), from a user equipment (UE), a data traffic session request;
based on at least the data traffic session request and group policy criteria, select a policy node group from among a plurality of policy node groups, the plurality of policy node groups each comprising policy node peers grouped by a service type;
based on at least the selected policy node group, determine a selected policy node;
based on at least the selected policy node and the data traffic session request, establish a data traffic session for the UE; and
based on at least meeting policy node failover criteria and a failover latency timer, perform an inter-group or intra-group failover according to the group policy criteria.

9. The system of claim 8, wherein the policy node failover criteria comprises at least one criterion selected from the list consisting of:
a maximum error rate, a selectable latency timeout, a broken link, a pre-configured trigger condition, and a manual trigger.

10. The system of claim 8, wherein the operations are further operative to:
define the plurality of policy node groups, wherein defining the plurality of policy node groups comprises grouping the policy node peers by the service type.

11. The system of claim 8, wherein the operations are further operative to:
configure the failover latency timer to a selected latency timeout.

12. The system of claim 8, wherein the operations are further operative to:
configure the group policy criteria to specify policy node assignment criteria, inter-group failover criteria, and intra-group failover criteria.

13. The system of claim 12, wherein the policy node assignment criteria exclude an identified failover policy node from an initial policy node assignment.

14. The system of claim 8, wherein:
the service type comprises fourth generation (4G) cellular service, or fifth generation (5G) cellular service, or services from a particular vendor;
the policy node comprises a policy and charging rules function (PCRF) or a policy control function (PCF);
the data traffic session comprises a voice over long term evolution (VoLTE) call or a voice over new radio (VoNR) call; and
the data traffic session request comprises a session initiation protocol (SIP) invite.

15. One or more computer storage devices having computer-executable instructions stored thereon, which, upon execution by a computer, cause the computer to perform operations comprising:
receiving, at a proxy-call session control function (P-CSCF), from a user equipment (UE), a data traffic session request;
based on at least the data traffic session request and group policy criteria, selecting a policy node group from among a plurality of policy node groups, the plurality of policy node groups each comprising policy node peers grouped by a service type;
based on at least the selected policy node group, determining a selected policy node;
based on at least the selected policy node and the data traffic session request, establishing a data traffic session for the UE; and
based on at least meeting policy node failover criteria and a failover latency timer, performing an inter-group or intra-group failover according to the group policy criteria.

16. The one or more computer storage devices of claim 15, wherein the policy node failover criteria comprises at least one criterion selected from the list consisting of:
a maximum error rate, a selectable latency timeout, a broken link, a pre-configured trigger condition, and a manual trigger.

17. The one or more computer storage devices of claim 15, wherein the operations further comprise:
defining the plurality of policy node groups, wherein defining the plurality of policy node groups comprises grouping the policy node peers by the service type.

18. The one or more computer storage devices of claim 15, wherein the operations further comprise:
configuring the failover latency timer to a selected latency timeout.

19. The one or more computer storage devices of claim 15, wherein the operations further comprise:
configuring the group policy criteria to specify policy node assignment criteria, inter-group failover criteria, and intra-group failover criteria.

20. The one or more computer storage devices of claim 19, wherein the policy node assignment criteria exclude an identified failover policy node from an initial policy node assignment.

* * * * *